(12) United States Patent
Martinez et al.

(10) Patent No.: US 9,036,810 B1
(45) Date of Patent: *May 19, 2015

(54) SYSTEM AND METHOD TO PROVIDE A RESPONSE TO AN INQUIRY

(71) Applicant: United Services Automobile Association (USAA), San Antonio, TX (US)

(72) Inventors: David A. Martinez, San Antonio, TX (US); Robert W. Barner, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/154,985

(22) Filed: Jan. 14, 2014

Related U.S. Application Data

(63) Continuation of application No. 11/734,486, filed on Apr. 12, 2007, now Pat. No. 8,630,402.

(51) Int. Cl.
*H04M 3/00* (2006.01)
*H04M 5/00* (2006.01)
*H04M 3/523* (2006.01)

(52) U.S. Cl.
CPC ...... *H04M 3/5233* (2013.01); *H04M 2203/408* (2013.01); *H04M 3/5235* (2013.01)

(58) Field of Classification Search
CPC ... H04M 3/51; H04M 3/5166; H04M 3/5175; H04M 3/5183; H04M 3/523; H04M 3/5232; H04M 3/5233; H04M 3/5237; H04M 3/5238; H04M 2203/2061; H04M 2242/12; G06Q 10/06

USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1

See application file for complete search history.

(56) References Cited

U.S. PATENT DOCUMENTS

| | | | |
|---|---|---|---|
| 5,890,139 | A | 3/1999 | Suzuki et al. |
| 6,035,283 | A | 3/2000 | Rofrano |
| 6,041,303 | A | 3/2000 | Mathews |
| 6,122,632 | A | 9/2000 | Botts et al. |
| 6,477,567 | B1 | 11/2002 | Ohara |
| 6,542,897 | B2 | 4/2003 | Lee |
| 6,684,209 | B1 | 1/2004 | Ito et al. |
| 6,744,877 | B1 | 6/2004 | Edwards |
| 6,826,194 | B1 * | 11/2004 | Vered et al. ............... 370/449 |

(Continued)

OTHER PUBLICATIONS

Forbes, Sean "Keeping Customers Happy: Mixing E-Service and Live Help", Customer Inter@ction Solutions, Oct. 2002, 3 pgs.

(Continued)

*Primary Examiner* — Khai N Nguyen
(74) *Attorney, Agent, or Firm* — Joseph A. Fuchs; Nixon Peabody LLP

(57) ABSTRACT

Disclosed are systems and methods to provide a response to an inquiry. The systems and methods provide techniques to receive an inquiry from a party, wherein the inquiry comprises a plurality of inquiry classifiers that are provided by the party, determine a party status, translate the plurality of inquiry classifiers and the party status into a skill set, route the inquiry to a primary representative based on the skill set, and provide a inquiry response to the party.

12 Claims, 9 Drawing Sheets

(56) References Cited

U.S. PATENT DOCUMENTS

| | | | |
|---|---|---|---|
| 6,832,202 | B1 | 12/2004 | Schuyler et al. |
| 6,832,203 | B1 | 12/2004 | Villena et al. |
| 6,850,613 | B2 | 2/2005 | McPartlan et al. |
| 6,934,381 | B1 | 8/2005 | Klein et al. |
| 7,058,565 | B2 | 6/2006 | Gusler et al. |
| 7,076,456 | B1 | 7/2006 | Rofrano |
| 7,149,303 | B1 | 12/2006 | Laurinavichus |
| 7,181,418 | B1 | 2/2007 | Zucker et al. |
| 8,630,402 | B1 | 1/2014 | Martinez et al. |
| 2001/0047270 | A1 | 11/2001 | Gusick et al. |
| 2003/0135403 | A1 | 7/2003 | Sanderson et al. |
| 2004/0044542 | A1 | 3/2004 | Beniaminy et al. |
| 2006/0008070 | A1* | 1/2006 | Hollatz ............. 379/265.11 |
| 2006/0182258 | A1* | 8/2006 | Sisselman et al. ... 379/265.02 |
| 2006/0256954 | A1* | 11/2006 | Patel et al. ......... 379/265.12 |
| 2007/0121898 | A1* | 5/2007 | Patakula et al. ..... 379/265.05 |
| 2007/0206770 | A1* | 9/2007 | Yamanaka .......... 379/265.01 |
| 2007/0291922 | A1* | 12/2007 | Matteo et al. ....... 379/265.01 |

OTHER PUBLICATIONS

RightNow eService Center Makes Real-Time Web Chat a Powerful, Integrated & Manageable Customer Channel, PR Newswire, Dec. 16, 2002, 1 pg.

* cited by examiner

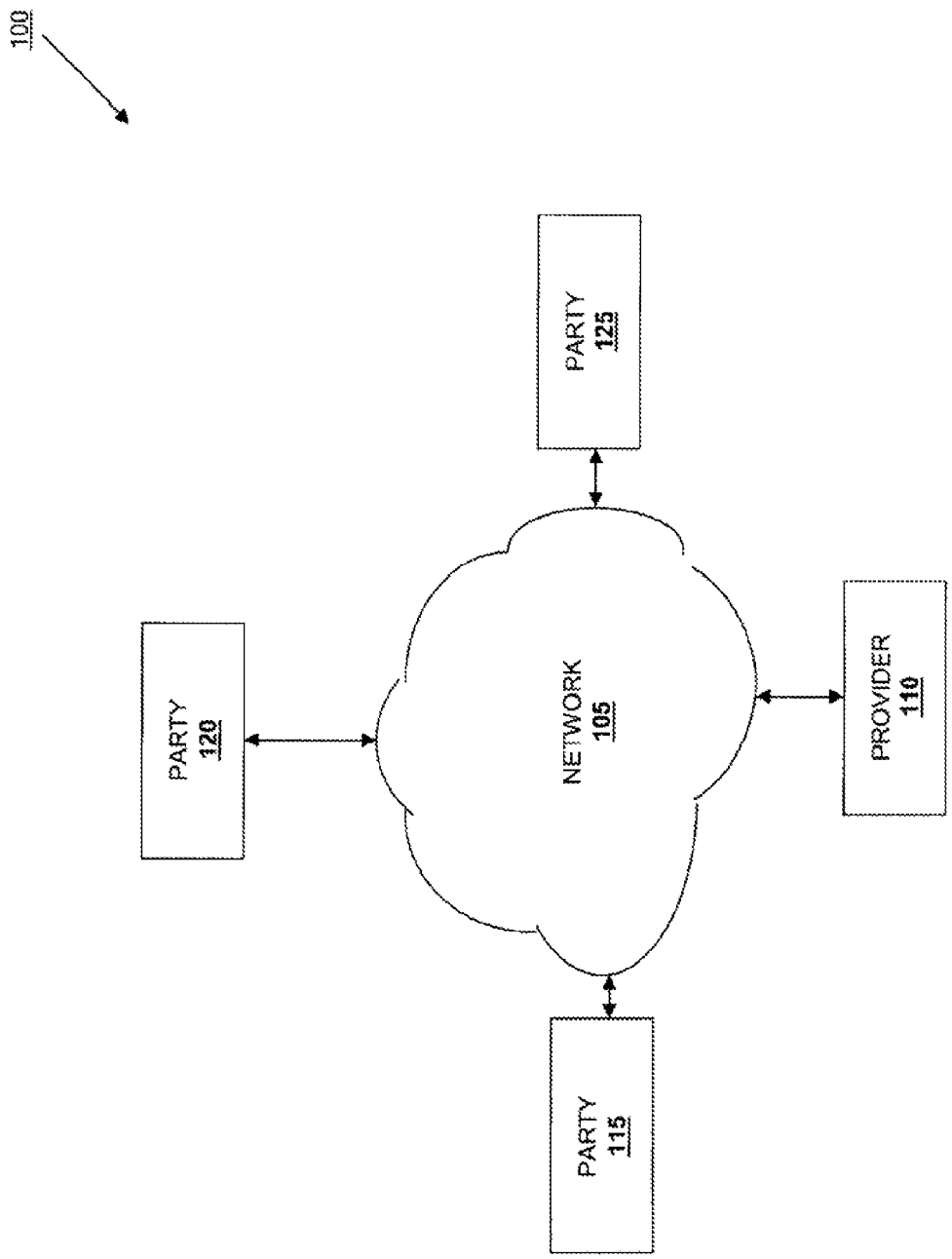

SYSTEM AND METHOD TO PROVIDE A RESPONSE TO AN INQUIRY

CROSS REFERENCE TO RELATED APPLICATIONS

The present application is a continuation of U.S. patent application Ser. No. 11/734,486, filed Apr. 12, 2007, now U.S. Pat. No. 8,630,402, and is related in subject matter to U.S. patent application Ser. No. 11/734,457, filed Apr. 12, 2007, and U.S. patent application Ser. No. 11/734,524, filed Apr. 12, 2007.

FIELD OF THE DISCLOSURE

Various embodiments of the disclosure pertain to a system and method to receive an inquiry from a party, wherein the inquiry comprises a plurality of inquiry classifiers that are provided by the party, determine a party status, translate the plurality of inquiry classifiers and the party status into a skill set, route the inquiry to a primary representative based on the skill set, and provide a inquiry response to the party.

BACKGROUND

Providing a response to an inquiry is well-known and readily appreciated by those of skill in the art. Typically, a customer may have questions about a good or service provided by a provider, and that customer may submit an inquiry to the provider. For example, the provider may provide a form on a website for the customer to submit the inquiry, and that form may ask for a general subject and a brief description of the inquiry. The inquiry is then sent to a representative of the provider, and the representative provides the customer with a response to the inquiry.

However, when the provider provides multiple lines of business including many different goods and/or services, such conventional systems and methods for providing a response to an inquiry raise a number of issues. Typically, the different lines of business use different processes and applications for responding to the customer inquiries, resulting in an appearance to the customer that the provider is a plurality of independent businesses rather than one entity including a plurality of business lines that provide multiple goods and/or services. A multiple-business-line provider may require that the customer submit their inquiry by classifying their question as a general subject and including a description of the subject matter of the question. The inquiry is then sent to a database with all other inquiries from other customers. A plurality of representatives then choose inquiries from the database, typically based on their knowledge of the general subject that the customer classified the inquiry. However, the customer may incorrectly classify the general subject of the question, resulting in the representative not being able to provide a response that satisfies the customer, or the representative may not have the proper knowledge of the general subject of the inquiry to provide a response that satisfies the customer. Furthermore, the inquiry may include multiple inquiries that run across different lines of businesses of the provider, and the representative may not have the proper knowledge to provide a response to all the different inquiries such that the customer is satisfied with the response. Conventional solutions to these problems include manually reviewing and routing inquiries to ensure that they reach representatives with the proper knowledge to provide a response that satisfies the customer. Such solutions are time intensive and result in longer response times. Other solutions include using artificial intelligence programs that search the description of the subject matter of the question provided by the customer and classify the inquiry based on that terms found in that search. Such solutions are prone to errors in classification.

Accordingly, it would be desirable to provide an improved system and method to provide a response to an inquiry.

SUMMARY

Various embodiments of the present disclosure are directed to systems and methods to provide a response to an inquiry. The systems and methods provide techniques to receive an inquiry from a party, wherein the inquiry comprises a plurality of inquiry classifiers that are provided by the party, determine a party status, translate the plurality of inquiry classifiers and the party status into a skill set, route the inquiry to a primary representative based on the skill set, and provide a inquiry response to the party.

BRIEF DESCRIPTION OF THE DRAWINGS

FIG. 1a is a schematic view illustrating an embodiment of a system to provide a response to an inquiry.

FIG. 1b is a schematic view illustrating an embodiment of an information handling system used with the system to provide a response to an inquiry of FIG. 1a.

FIG. 1c is a schematic view illustrating an embodiment of a provider used in the system to provide a response to an inquiry of FIG. 1a.

FIG. 2b is a screen shot illustrating an embodiment of a product and/or services website used in the method of FIG. 2a.

FIG. 2c is a screen shot illustrating an embodiment of a credit card website used in the method of FIG. 2a.

FIG. 2d is a screen shot illustrating an embodiment of an inquiry form website used in the method of FIG. 2a.

FIG. 2e is a screen shot illustrating an embodiment of a representative skill set website used in the method of FIG. 2a.

FIG. 2f is a screen shot illustrating an embodiment of a representative worklist website used in the method of FIG. 2a.

DETAILED DESCRIPTION

Figure 1B:
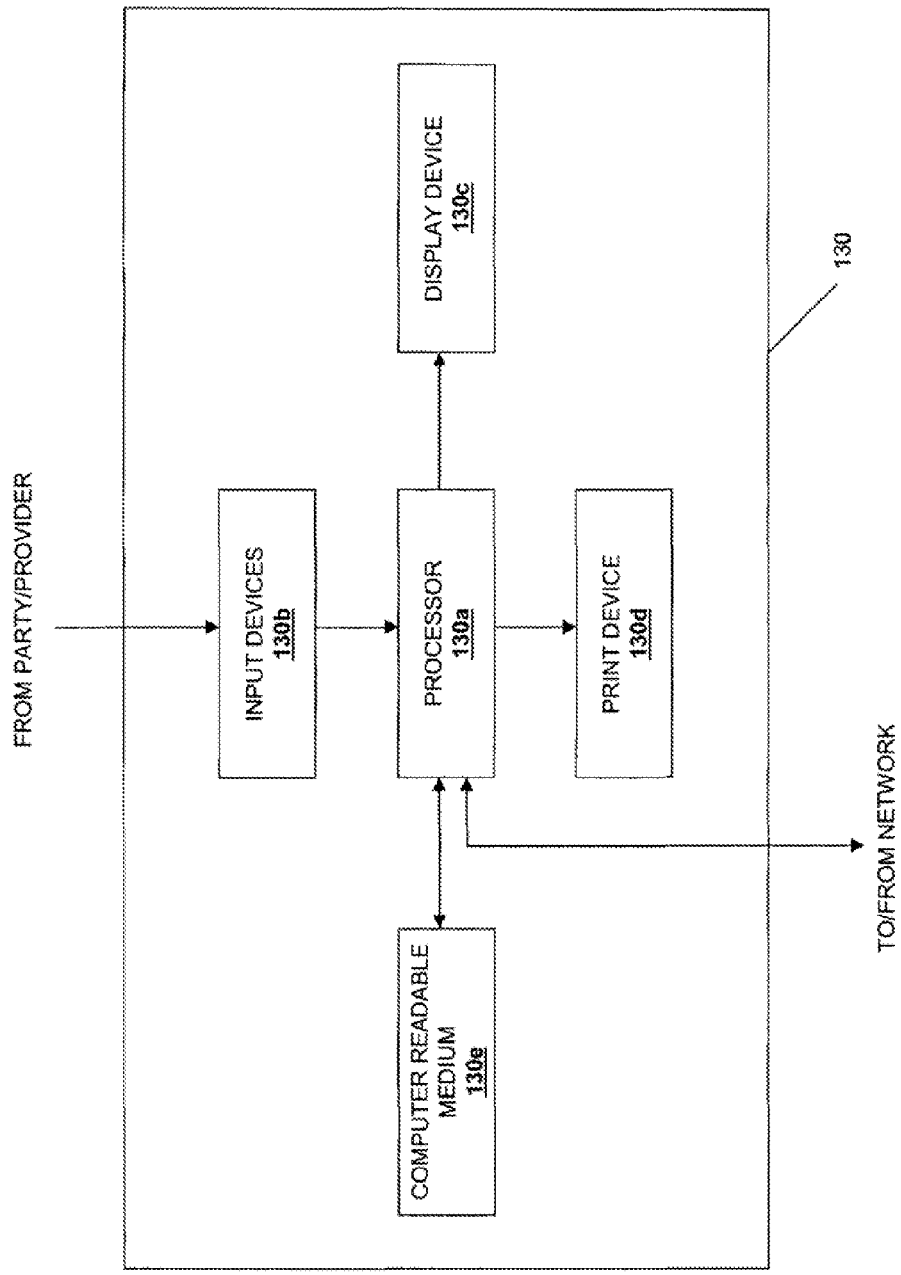

Referring now to FIG. 1a, in one embodiment, a system to provide a response to an inquiry 100 is illustrated. The system 100 includes a computer network 105 such as, for example, a Transport Control Protocol/Internet Protocol (TCP/IP) network (e.g., the internet or an intranet). A provider 110 is operably coupled to the network 105. A plurality of parties 115, 120 and 125 are also operably coupled to the network 105 in order to allow communication between the parties 115, 120 and 125 and the provider 110. In an embodiment, the provider 110 includes any entity providing products and/or services. In an embodiment, the provider 110 may include a plurality of business lines such as, for example, banking, insurance, financial services, loan providing, and/or a variety of other services known in the art, and the provider 110 may offer a plurality of products and/or services in each business line. In an embodiment, the provider 110 includes a membership organization which provides a plurality of services for its members such as, for example, banking, insurance, financial services, loan providing, and/or a variety of other services known in the art, wherein the members include parties 115, 120 and 125. In an embodiment, the provider 110 is a third party to a party and a provider where the provider is attempting to provide products and/or services to the party. In an embodiment, the parties 115, 120 and 125 may be, for example, a person interested in a product or service offered by a provider.

Each of the provider 110 and the parties 115, 120 and 125 includes a respective network interface for communicating with the network 105 (e.g., outputting information to, and receiving information from, the network 105), such as by transferring information (e.g., instructions, data, signals) between such parties and the network 105. Accordingly, through the network 105, the provider 110 communicates with the parties 115, 120 and 125, and the parties 115, 120 and 125 communicate with the provider 110.

For clarity, FIG. 1a depicts only one provider 110. However, the system 100 may include a plurality of providers. Likewise, for clarity, FIG. 1a depicts only three parties 115, 120 and 125. However, the system 100 may include a plurality of parties. In the discussion below, the party 115 is a representative one of the parties 115, 120 and 125.

Each of the provider 110 and the parties 115, 120 and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other. Accordingly, the provider 110 and the parties 115, 120 and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer-readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., a random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer-readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer-readable medium 130e and the processor 130a are structurally and functionally interrelated with one another as described below in further detail. Each IHS of the illustrative embodiment is structurally and functionally interrelated with a respective computer-readable medium, similar to the manner in which the processor 130a is structurally and functionally interrelated with the computer-readable medium 130e. In that regard, the computer-readable medium 130e is a representative one of such computer-readable media including, for example, but not limited to, a hard disk drive.

The computer-readable medium 130e stores (e.g., encodes, records, or embodies) functional descriptive material (e.g., including but not limited to software (also referred to as computer programs or applications) or data structures). Such functional descriptive material imparts functionality when encoded on the computer-readable medium 130e. Also, such functional descriptive material is structurally and functionally interrelated to the computer-readable medium 130e.

With such functional descriptive material, data structures define structural and functional interrelationships between such data structures and the computer-readable medium 130e (and other aspects of the system 100). Such interrelationships permit the data structures' functionality to be realized. Also, within such functional descriptive material, computer programs define structural and functional interrelationships between such computer programs and the computer-readable medium 130e (and other aspects of the system 100). Such interrelationships permit the computer programs' functionality to be realized.

For example, the processor 130a reads (e.g., accesses or copies) such functional descriptive material from the computer-readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer-readable medium) for causing the processor 130a to perform additional operations (as described elsewhere herein). Accordingly, such functional descriptive material exhibits a functional interrelationship with the way in which processor 130a executes its processes and performs its operations.

Further, the computer-readable medium 130e is an apparatus from which the computer application is accessible by the processor 130a, and the computer application is processable by the processor 130a for causing the processor 130a to perform such additional operations. In addition to reading such functional descriptive material from the computer-readable medium 130e, the processor 130a is capable of reading such functional descriptive material from (or through) the network 105 which is also a computer-readable medium (or apparatus). Moreover, the memory device of the IHS 130 is itself a computer-readable medium (or apparatus).

Figure 1C:
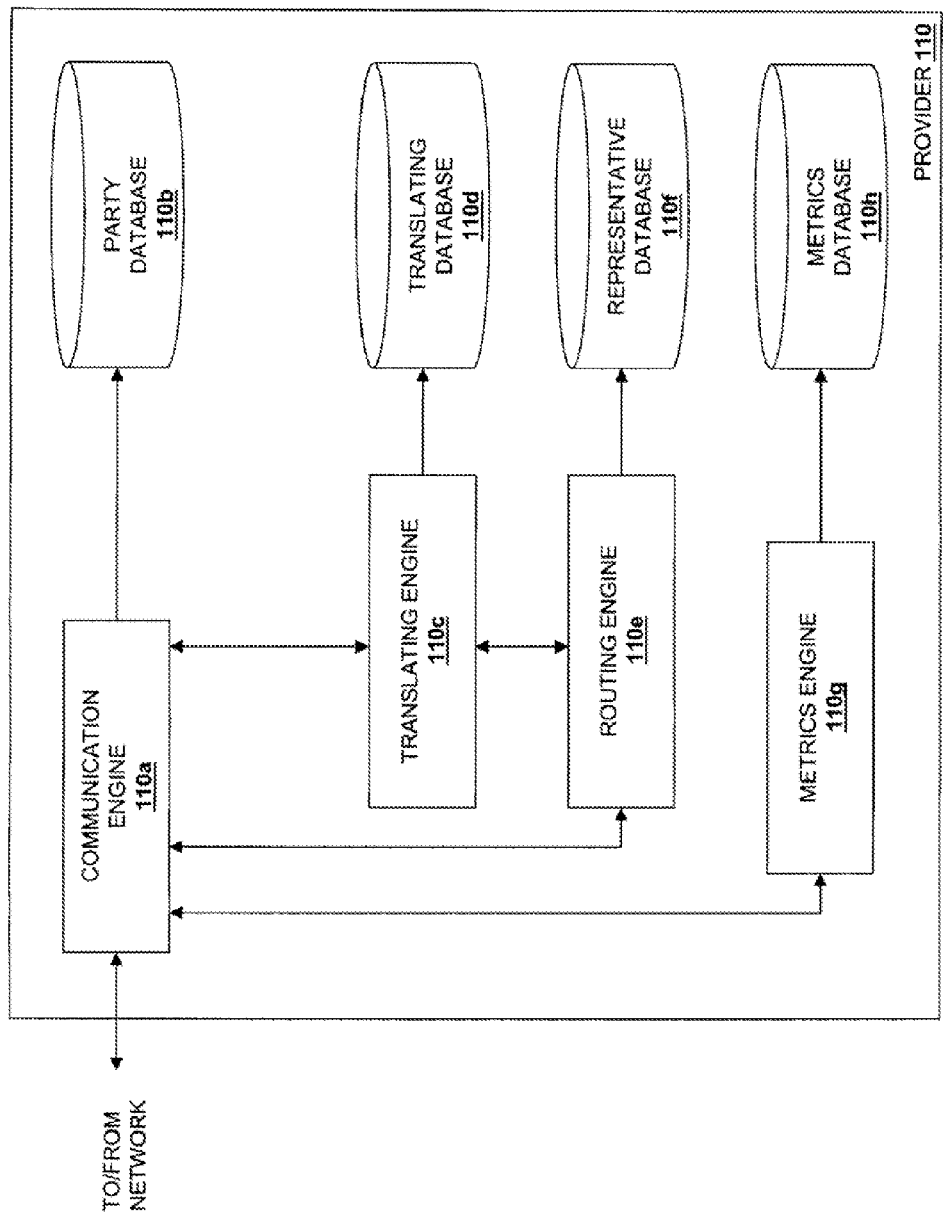
Figure 2A:
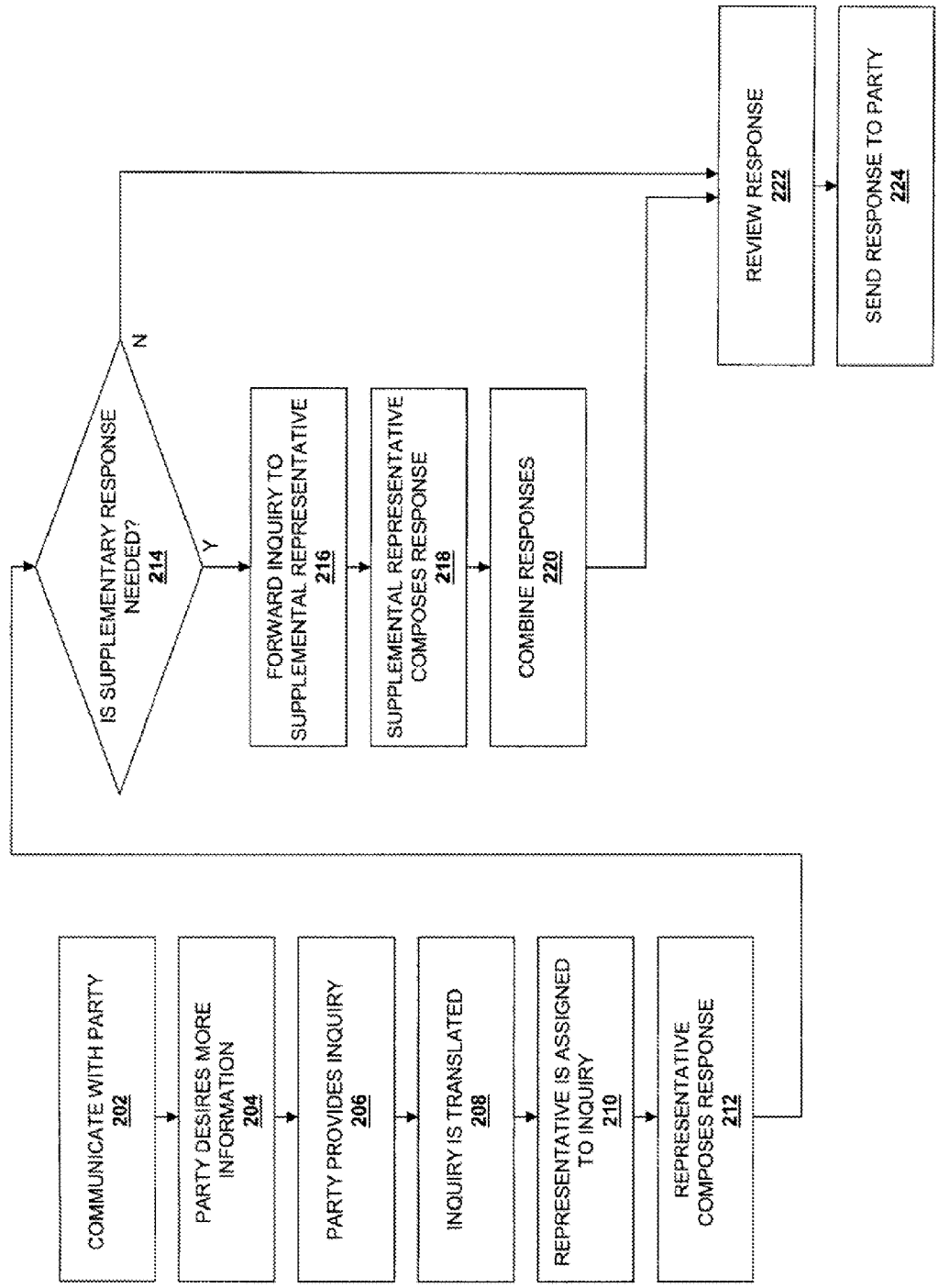
FIG. 2a is a flow chart illustrating an embodiment of a method to provide a response to an inquiry.
Figure 2B:
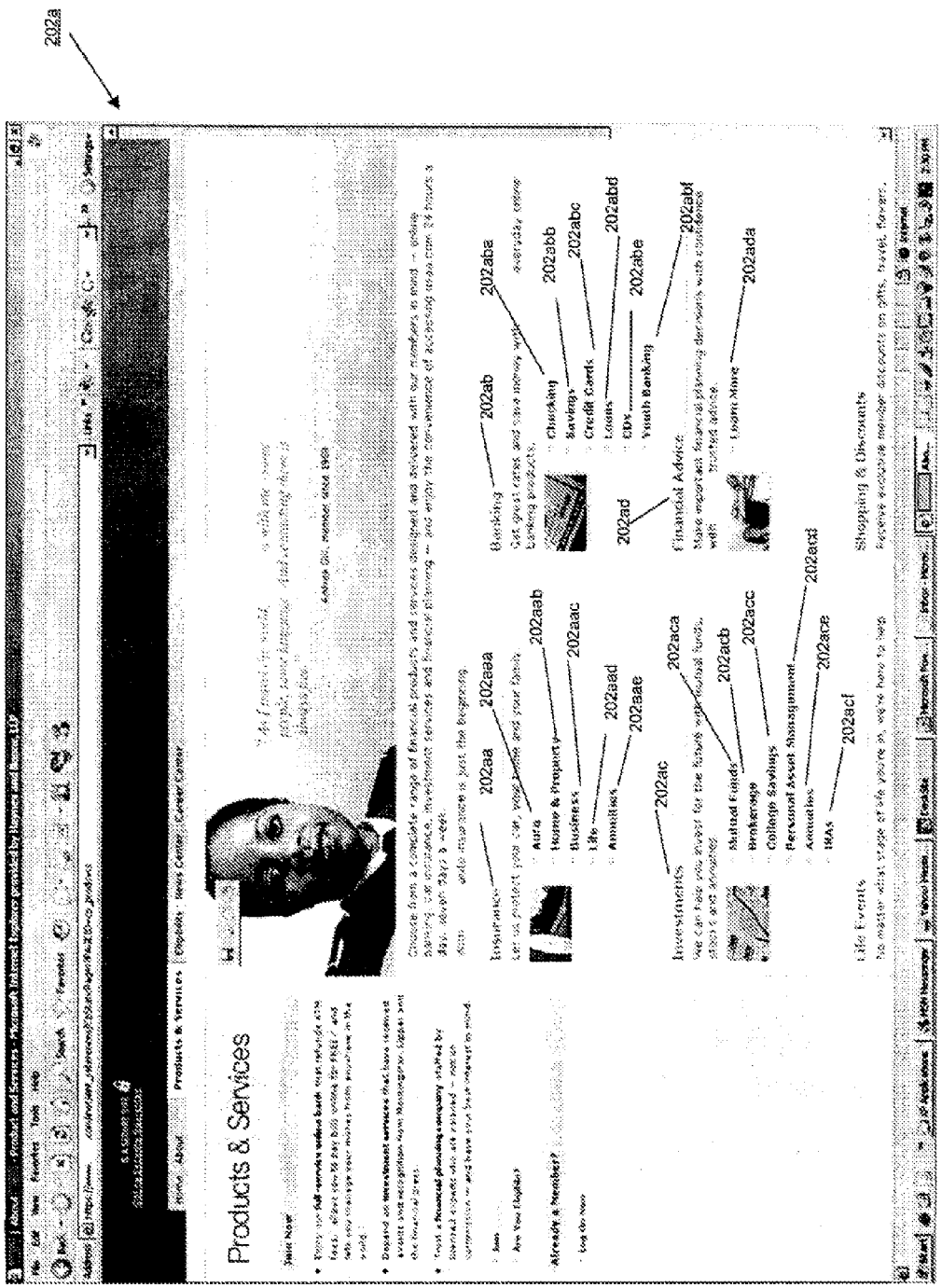
Figure 2C:
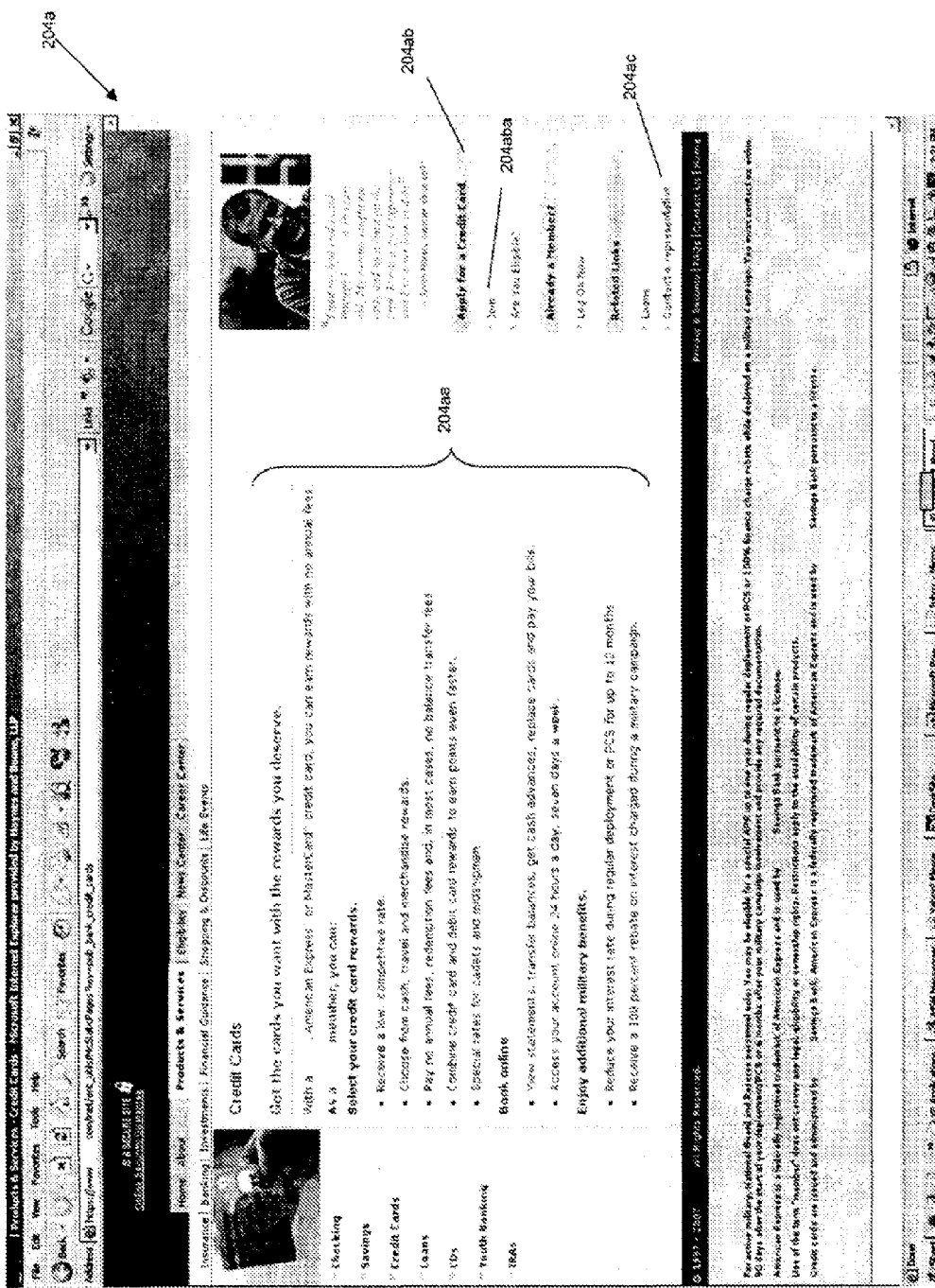
Figure 2D:
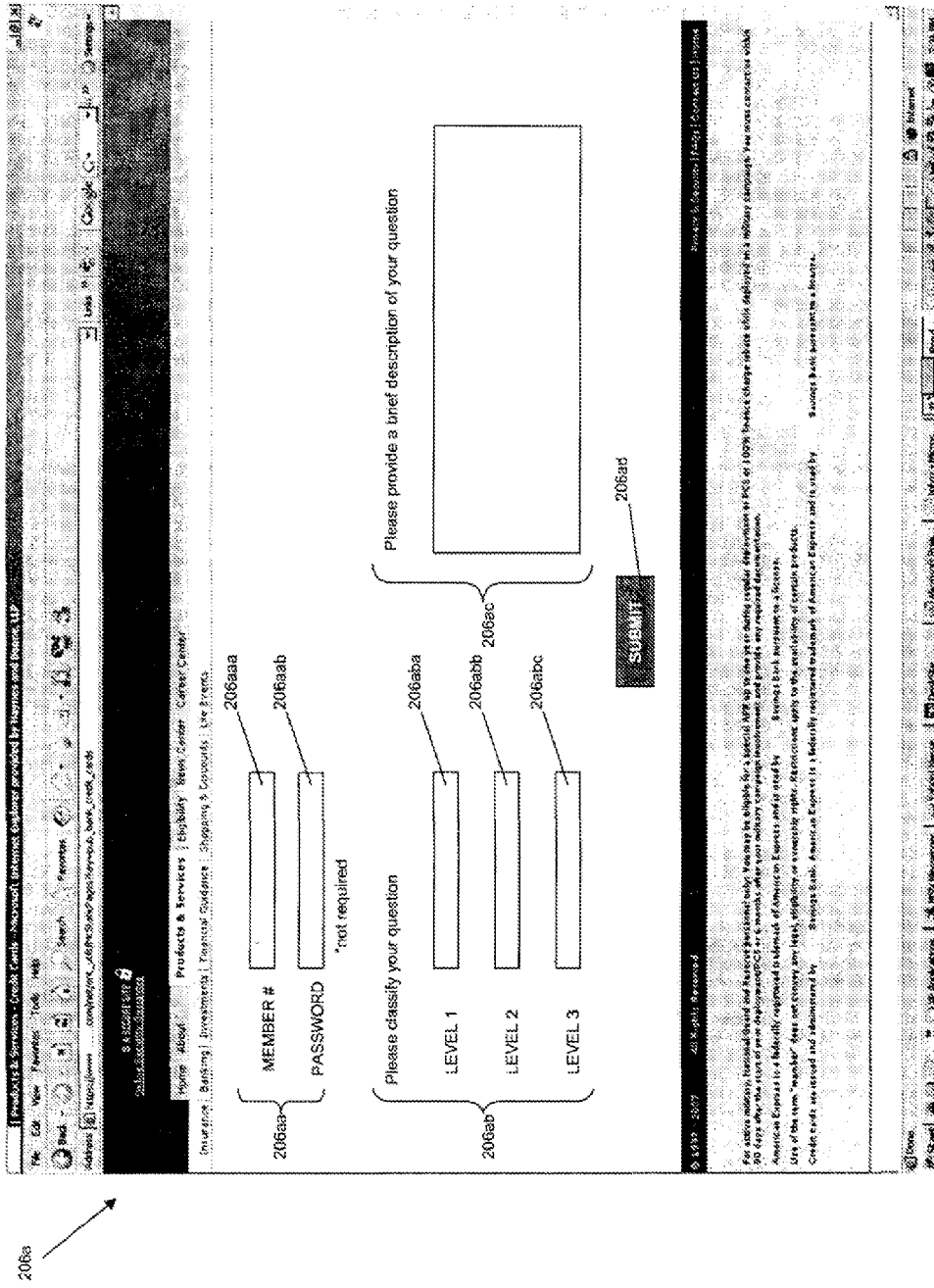
Figure 2E:
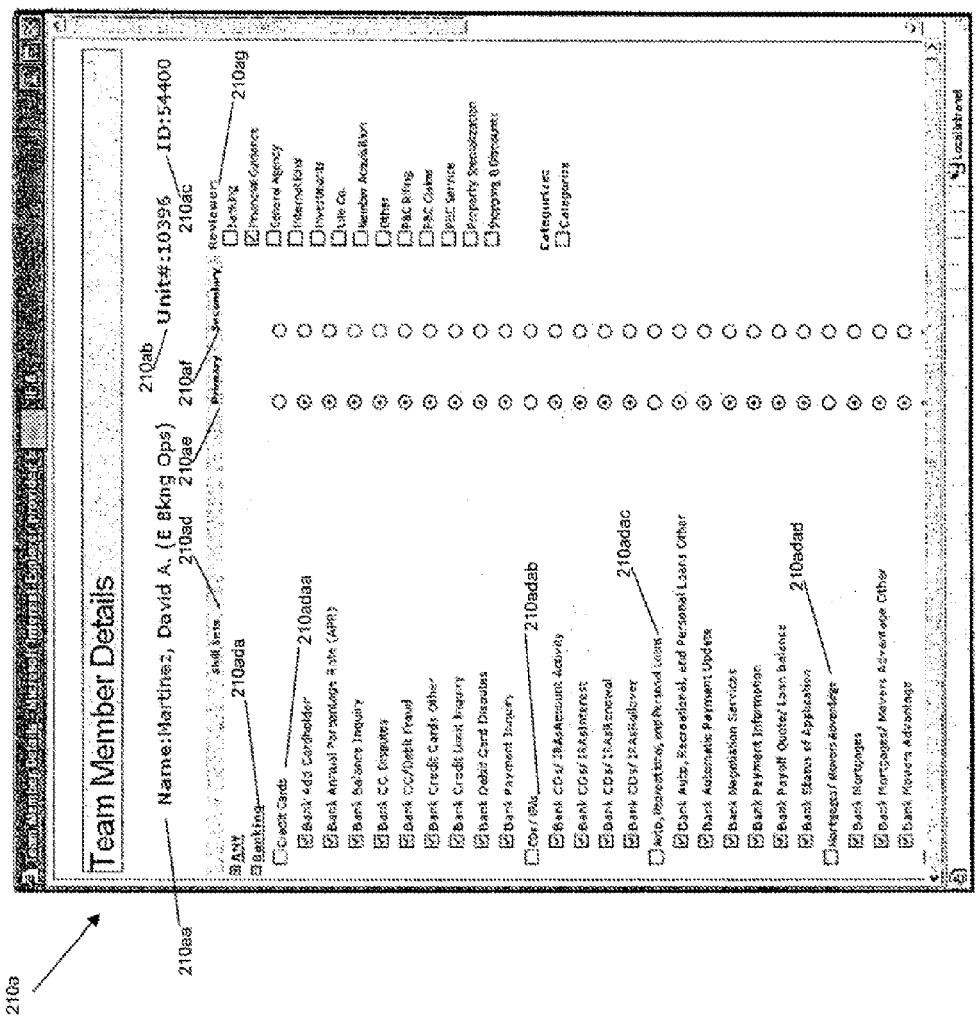
Figure 2F:
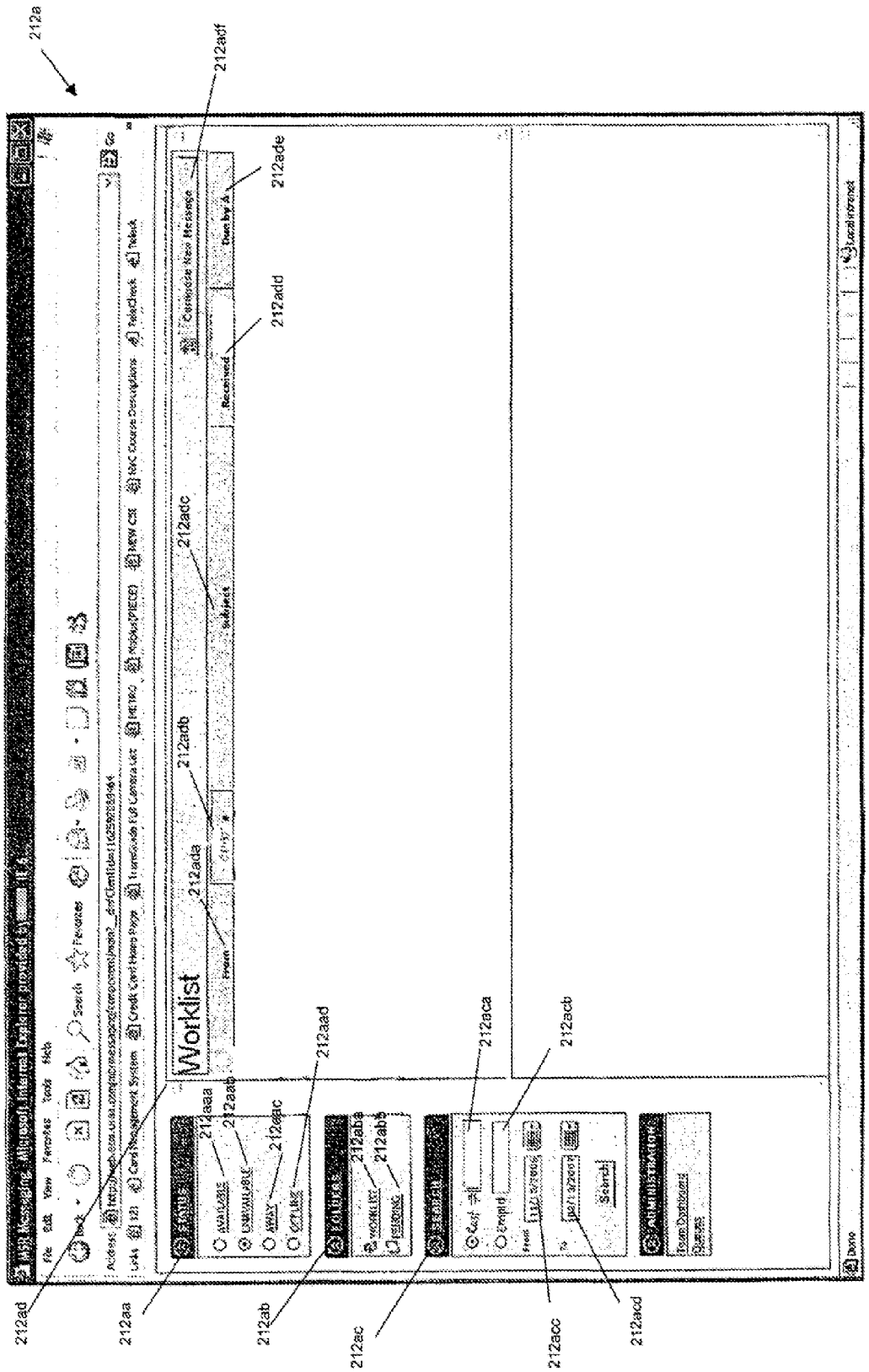

Referring now to FIGS. 1a, 1b and 1c, the provider 110 is illustrated in more detail. A communication engine 110a which may be, for example, software stored on the computer-readable medium 130e in the IHS 130, is included in the provider 110 and is operably coupled to the network 105, described above with reference to FIG. 1a, and to a party database 110b. A translating engine 110c which may be, for example, software stored on the computer-readable medium 130e in the IHS 130 or a representative of the provider 110, is included in the provider 110 and is operably coupled to the communication engine 110a, the network 105, described above with reference to FIG. 1a, and a translating database 11d. A routing engine 110e which may be, for example, software stored on the computer-readable medium 130e in the IHS 130 or a representative of the provider 110, is included in the provider 110 and is operably coupled to the customer communication engine 110a, the network 105, described above with reference to FIG. 1a, the translating engine 110c, and a representative database 110f. A metrics engine 110g which may be, for example, software stored on the computer-readable medium 130e in the IHS 130 or a representative of the provider 110, is included in the provider 110 and is operably coupled to the customer communication engine 110a, the network 105, described above with reference to FIG. 1a, and a metrics database 110h. In an embodiment, the party database 110b, the translating database 110d, the representative database 110f, and/or the metrics database 110h are conventional databases known in the art. In an embodiment, the party database 110b, the translating database 110d, the representative database 110f, and/or the metrics database 110h may be located outside the provider 110 and still operably coupled to the provider 110 and the communication engine 110a through, for example, the network 105, described above with reference to FIG. 1a. In an embodiment, the party database 110b, the translating database 110d, the representative database 110f, and/or the metrics database 110h include a plurality of databases. In an embodiment, the provider 110 is a membership organization and the party database 110b includes a variety of previously collected information on members of the membership organization. In an embodiment, the party database 110b, the translating database 110d, the representative database 110f, and/or the metrics database 110h are publicly available databases. In an embodiment, the party database 110b, the translating database 110d, the representative database 110f, and/or the metrics database 110h are private databases which are available to be accessed by the provider 110.

Referring now to FIGS. 1a, 1b, 1c, 2a and 2b, a method 200 to provide a response to an inquiry is illustrated. The illustrated embodiment of the method 200 is described below as it may be applied to a website that transfers information over a network such as, for example, the network 105, described above with reference to FIG. 1a. However, the method 200 is not limited to websites and may be practiced using phone communication, fax communication, short message services or text messaging, face-to-face communication, and a variety of other communication techniques known in the art. Throughout the description of the method 200, embodiments will be briefly described that utilize these forms of communication that are alternatives to the websites used in the illustrated embodiment. The method 200 begins at step 202 where the provider 110 communicates with a party such as, for example, the party 115, described above with reference to FIG. 1a. In the illustrated embodiment, the provider 110 provides a products and/or services website 202a through the network 105. The products and/or services website 202a includes an insurance product and/or service 202aa, a banking product and/or service 202ab, an investment product and/or service 202ac, and a financial advice product and/or service 202ad. The insurance product and/or service 202aa includes a plurality of links such as, for example, an auto insurance link 202aaa, a home and property insurance link 202aab, a business insurance link 202aac, a life insurance link 202aad, and an annuities insurance link 202aae. The banking product and/or service 202ab includes a plurality of links such as, for example, an checking link 202aba, a savings link 202abb, a credit cards link 202abc, a loans link 202abd, a Certificate of Deposits (CDs) link 202abe, and a youth banking link 202abf. The investment product and/or service 202ac includes a plurality of links such as, for example, an mutual funds link 202aca, a brokerage link 202acb, a college savings link 202acc, a personal asset management link 202acd, an annuities link 202ace, and a Individual Retirement Accounts (IRAs) link 202acf. The financial advice product or service 202ad includes a learn more link 202ada. In an embodiment, the provider 110 provides a plurality products and/or services websites that are substantially similar to the products and/or services website 202a but which each contain products and/or services relating to different business lines of the provider 110. In an alternative embodiment, the provider 110 may provide information about products and/or services in a newspaper, on a billboard, in a television ad, or in a variety of other locations using a variety of other methods known in the art.

Referring now to FIGS. 1a, 1b, 1c, 2a, 2b and 2c, the method 200 then proceeds to step 204 where the party 115 desires more information. While viewing the products and/or service website 202a in step 202 of the method 200, the party 115 may desire more information on a first subject such as, for example, credit cards. The party 115 may then use the credit card link 202abc under the banking products and/or services 202ab to access a credit cards information website 204a. Upon the selection of the credit card link 202abc by the party 115, the communication engine 110a provides the party 115 with the credit cards website 204a. The credit card website 204a includes a plurality of information 204aa about credit cards offered by the provider. The credit card website 204a may also include an application section 204ab having a join link 204aba such that the party 115 may apply for a credit card 204ac by selecting the join link 204aba. The credit card website 204a also includes a contact a representative link 204ac.

Referring now to FIGS. 1a, 1b, 1c, 2a, 2c and 2d, the method 200 then proceeds to step 206 where the party 115 provides an inquiry. If the party 115 does not find the desired information on the first subject desired in step 204 of the method 200, the party 115 may use the contact a representative link 204ac to access a inquiry form website 206a. Upon the selection of the contact a representative link 204ac by the party 115, the communication engine 110a provides the party 115 with the inquiry form website 206a. The inquiry form website 206a includes a party identifying section 206aa having a party identification field 206aaa and a security field 206aab. The inquiry form website 206a also includes a inquiry classification section 206ab having a plurality of inquiry classifier fields 206aba, 206abb and 206abc. The inquiry form website 206a also includes a inquiry narrative section 206ac and a submit link 206ad. In an embodiment, the provider 110 may be a membership organization, the party 115 may be a member of the membership organization, and the party 115 may provide a party identifier in the party identification field 206aaa such as, for example, a member number provided by provider 110, and a security password in the security field 206aab such as, for example, any combination of characters that the provider 110 has associated with the party 115 and provided to the party 115. In an alternative embodiment, the party 115 may not be a member of the membership organization, and the party identification field 206aaa and the security field 206aab in the party identifying section 206aa may be left blank. The party 115 then provides an inquiry classifier in each of the inquiry classifier fields 206aba, 206abb and 206abc of the inquiry classification section 206ab. In an embodiment, each of the plurality of inquiry classifier fields 206aba, 206abb and 206abc are drop-down menus. In an embodiment, a first inquiry classifier may be selected from the drop down menu in the inquiry classifier field 206aba and the selection of that first inquiry classifier dictates the availability of choices for a second inquiry classifier in the drop down menu in the inquiry classifier field 206abb, and the selection of the second inquiry classifier in the drop down menu in the inquiry classifier field 206abc dictates the availability of choices for a third inquiry classifier in the drop down menu in the inquiry classifier field 206abc. The party 115 also provides a brief description or narrative of the inquiry in the Inquiry narrative section 206ac. The party 115 may then select the submit link 206ad to provide the inquiry to the provider 110. In an embodiment, a plurality of parties such as, for example, the parties 115, 120 and 125 may provide a plurality of inquiries to the provider 110 regarding a plurality of different subjects in substantially the same manner as described above. In an embodiment, the inquiry may be for the first subject and a second subject relating to any of the products and/or services offered by the provider 110 in the plurality of business lines of the provider 110. In an alternative embodiment, the party 115 may see the product and/or service information, for example, in a newspaper, on a billboard, in a television ad, or in a variety of other locations using a variety of other methods known in the art, and may access the inquiry form using a variety of different methods such as, for example, calling a phone number or sending a text message. In the case of calling a phone number to access the inquiry form, the party 115 may be connected to a representative through phone communication and the representative may prompt the party 115 for the inquiry classifiers and/or the party status information. In the case of sending a text message to access the inquiry form, the party 115 may use a short message service (SMS) to provide the inquiry classifiers and/or the party status information to the representative of the provider 110.

Referring now to FIGS. 1a, 1b, 1c, 2a and 2d, the method 200 then proceeds to step 208 where the inquiry is translated. The communication engine 110a takes the party identifier provided in the party identification field 206aaa and the security password provided in the security field 206aab, and accesses the party database 110b to retrieve a party status of the party 115. In an embodiment, the party database 110b includes previously collected information on the party 115 and the party status may be, for example, military rank, employment status, job title, or a variety of other party status known in the art and listed below with reference to the charts describing step 208 of the method 200. In an embodiment, the party status includes any attribute of the party 115 that is used to classify the inquiry from the party 115. The translating engine 110c then accesses the translating database 110d and may use the party status and the inquiry classifiers provided in the inquiry classifier fields 206aba, 206abb and 206abc to translate the inquiry into a skill set. In an embodiment, the translating engine 110c may use information from the communication engine 110a such as, for example, the content of the website that the party 115 was on before the party 115 accessed the inquiry form website 206a. In an embodiment, the translating engine 110c may include an artificial intelligence engine that is operable to access the narrative provided in the inquiry narrative section 206ac on the inquiry form website 206a and determine a first or second subject that the party 115 desires information on. In an embodiment, different combinations of the first inquiry classifier 208a, second inquiry classifier 208b, third inquiry classifier 208c, and party status 208d translate into a skill set 208e. For example, the chart below illustrates a plurality of possibilities available for a first inquiry classifier 208a of "Banking", including the available second inquiry classifiers 208b when "Banking" is selected as the first inquiry classifier and the available third inquiry classifiers for the selected second inquiry classifiers. Furthermore, the chart below illustrates that the party status 208d may or may not help determine the skill set 208e:

| 1$^{st}$ Inquiry Classifier 208a | 2$^{nd}$ Inquiry Classifier 208b | 3$^{rd}$ Inquiry Classifier 208c | Party Status 208d | Skill Set 208e |
|---|---|---|---|---|
| Banking | ANY | ANY | Bank Executive Complaint | Bank Executive Complaint |
| Banking | ANY | ANY | Employee | Employee Submitted Bank Inquiries |
| Banking | ANY | ANY | Select | Bank Select |
| Banking | Auto, Recreational, and Personal Loans | Automatic Payment Update | | Bank Automatic Payment Update |
| Banking | Auto, Recreational, | Negotiation Services | | Bank Negotiation Services |

| 1st Inquiry Classifier 208a | 2nd Inquiry Classifier 208b | 3rd Inquiry Classifier 208c | Party Status 208d | Skill Set 208e |
|---|---|---|---|---|
| | and Personal Loans | | | |
| Banking | Auto, Recreational, and Personal Loans | Other | | Bank, Auto, Recreational, and Personal Loans Other |
| Banking | Auto, Recreational, and Personal Loans | Payment Information | | Bank Payment Information |
| Banking | Auto, Recreational, and Personal Loans | Payoff Quote/ Loan Balance | | Bank Payoff Quote/ Loan Balance |
| Banking | Auto, Recreational, and Personal Loans | Status of Application | | Bank Status of Application |
| Banking | CDs/IRAs | Account Activity | | Bank CDs/IRAs Account Activity |
| Banking | CDs/IRAs | Interest | | Bank CDs/IRAs Interest |
| Banking | CDs/IRAs | Renewal | | Bank CDs/IRAs Renewal |
| Banking | CDs/IRAs | Rollover | | Bank CDs/IRAs Rollover |
| Banking | Checking & Savings | ATM/Debit Card | | Bank ATM/Debit Card |
| Banking | Checking & Savings | Account Activity/History | | Bank Account Activity/History |
| Banking | Checking & Savings | Check Orders/ Deposit Slips | | Bank Check Orders/ Deposit Slips |
| Banking | Checking & Savings | Funds Transfer | | Bank Funds Transfer |
| Banking | Checking & Savings | Other | | Bank Checking & Savings Other |
| Banking | Checking & Savings | Signature Cards | | Bank Signature Cards |
| Banking | Checking & Savings | Statements | | Bank Statements |
| Banking | Credit Cards | Add Cardholder | | Bank Add Cardholder |
| Banking | Credit Cards | Annual Percentage Rate (APR) | | Bank Annual Percentage Rate (APR) |
| Banking | Credit Cards | Balance Inquiry | | Bank Balance Inquiry |
| Banking | Credit Cards | CC Disputes | | Bank CC Disputes |
| Banking | Credit Cards | CC/Debit Fraud | | Bank CC/Debit Fraud |
| Banking | Credit Cards | Credit Limit Inquiry | | Bank Credit Limit Inquiry |
| Banking | Credit Cards | Debit Card Disputes | | Bank Debit Card Disputes |
| Bankins | Credit Cards | Other | | Bank Credit Cards Other |
| Banking | Credit Cards | Payment Inquiry | | Bank Payment inquiry |
| Banking | Home Equity Loans | About Home Equity Loans | | Bank About Home Equity Loans |
| Banking | Home Equity Loans | Convenience Check Request | | Bank Convenience Check Request |
| Banking | Home Equity Loans | Increase Credit Limit | | Bank Increase Credit Limit |
| Banking | Home Equity Loans | Other | | Bank Home Equity Loans Other |
| Banking | Home Equity Loans | Status of Application | | Bank Status of Application |
| Banking | Mortgages/ Movers Advantage | Mortgage | | Bank Mortgages |
| Banking | Mortgages/ Movers Advantage | Movers Advantage | | Bank Movers Advantage |
| Banking | Mortgages/ Movers Advantage | Other | | Bank Mortgages/ Movers Advantage Other |
| Banking | Other | N/A | | Bank Other |
| Banking | Web Bill Pay | Non Payment Inquiry | | Bank Web BillPay non-Payment Inquiry |
| Banking | Web Bill Pay | Other | | Bank Web BillPay Other |
| Banking | Web Bill Pay | Payment Inquiry | | Bank Web BillPay Payment Inquiry |

For example, the chart below illustrates a plurality of possibilities available for a first inquiry classifier 208a of "Enterprise". The chart below illustrates that the party status 208d is the only factor to determine the skill set 208e for a first inquiry classifier 208a of "Enterprise":

| 1st Inquiry Classifier 208a | 2nd Inquiry Classifier 208b | 3rd Inquiry Classifier 208c | Party Status 208d | Skill Set 208e |
|---|---|---|---|---|
| Enterprise | ANY | ANY | Enterprise Executive Complaint | Enterprise Executive Complaint |
| Enterprise | ANY | ANY | Enterprise Select | Enterprise Select |

For example, the chart below illustrates a plurality of possibilities available for a first inquiry classifier 208a of "Financial Guidance" including the available second inquiry classifiers 208b when "Financial Guidance" is selected as the first inquiry classifier and the available third inquiry classifiers for the selected second inquiry classifiers. Furthermore, the chart below illustrates that the party status 208d may not help determine the skill set 208e:

| 1st Inquiry Classifier 208a | 2nd Inquiry Classifier 208b | 3rd Inquiry Classifier 208c | Party Status 208d | Skill Set 208e |
|---|---|---|---|---|
| Financial Guidance | Buying A Car | Get an Auto Loan | | Financial Guidance Buying A CarGet an Auto Loan |
| Financial Guidance | Buying A Car | Negotiate Vehicle Price | | Financial Guidance Buying A Car Negotiate Vehicle Price |
| Financial Guidance | Buying A Car | Request an Auto Insurance Quote | | Financial Guidance Buying A CarRequest an Auto Insurance Quote |
| Financial Guidance | Change In Marital Status | Getting Divorced | | Financial Guidance Change In Marital Status |
| Financial Guidance | Change In Marital Status | Getting Married | | Financial Guidance Change In Marital Status |
| Financial Guidance | Changing Jobs | Military Retirement | | Financial Guidance Changing Jobs |
| Financial Guidance | Changing Jobs | Review Your Cash Flow and Budget | | Financial Guidance Changing Jobs |
| Financial Guidance | Changing Jobs | Review Your Life Insurance | | Financial Guidance Review Your Life Insurance |
| Financial Guidance | Changing Jobs | Review Your Retirement Needs | | Financial Guidance Changing Jobs |
| Financial Guidance | Deployment | Review Your Finances | | Financial Guidance Deployment Review Your Finances |
| Financial Guidance | Deployment | Review Your Life Insurance | | Financial Guidance Review Your Life Insurance |
| Financial Guidance | Deployment | Update Your Auto Insurance | | Financial Guidance Deployment Update Your Auto Insurance |
| Financial Guidance | Free Financial Advice | N/A | | Financial Guidance Free Financial Advice |
| Financial Guidance | Having a Baby and Parenting | Questions about College Savings Plans | | Financial Guidance Questions about College Savings Plans |
| Financial Guidance | Having a Baby and Parenting | Review Your Life Insurance | | Financial Guidance Review Your Life Insurance |
| Financial Guidance | Moving | Buy or Sell Your Home | | Financial Guidance Moving Buy or Sell Your Home |
| Financial Guidance | Moving | Get a Home Insurance Quote | | Financial Guidance Moving Get a Home Insurance Quote |
| Financial Guidance | Moving | Get a Home Loan | | Financial Guidance Moving Get a Home Loan |
| Financial Guidance | Moving | Get a Real Estate Agent | | Financial Guidance Moving Get a Real Estate Agent |
| Financial Guidance | Other Financial Advice | Other | | Financial Guidance Other Financial Advice |
| Financial Guidance | Personalized Financial Plans | Already Enrolled | | Financial Guidance Personalized Financial Plans Already Enrolled |
| Financial | Personalized | Looking For | | Financial Guidance |

-continued

| 1st Inquiry Classifier 208a | 2nd Inquiry Classifier 208b | 3rd Inquiry Classifier 208c | Party Status 208d | Skill Set 208e |
|---|---|---|---|---|
| Guidance | Financial Plans | Information | | Personalized Financial Plans Looking For Information |
| Financial Guidance | Retirement | Already Saving | | Financial Guidance Retirement Already Saving |
| Financial Guidance | Retirement | Considering Long Term Care Insurance | | Financial Guidance Retirement Considering Long Term Care Insurance |
| Financial Guidance | Retirement | Just Starting Out | | Financial Guidance Retirement Just Starting Out |
| Financial Guidance | Retirement | Military Retirement | | Financial Guidance Retirement Military Retirement |
| Financial Guidance | Retirement | Retired | | Financial Guidance Retirement Retired |
| Financial Guidance | Survivorship | Receiving an Inheritance | | Financial Guidance Survivorship |
| Financial Guidance | Survivorship | Review Life Insurance | | Financial Guidance Survivorship |

For example, the chart below illustrates a plurality of possibilities available for a first inquiry classifier 208a of "Investments" including the available second inquiry classifiers 208b when "Investments" is selected as the first inquiry classifier and the available third inquiry classifiers for the selected second inquiry classifiers. Furthermore, the chart below illustrates that the party status 208d may or may not help determine the skill set 208e:

| 1st Inquiry Classifier 208a | 2nd Inquiry Classifier 208b | 3rd Inquiry Classifier 208c | Party Status 208d | Skill Set 208e |
|---|---|---|---|---|
| Investments | ANY | ANY | Employee | Employee Submitted IMCO Inquiries |
| Investments | ANY | ANY | IMCO Executive Complaint | IMCO Executive Complaint |
| Investments | ANY | ANY | Select | IMCO Select |
| Investments | Annuities | Cancellation | | LifeCo Annuities Cancellation |
| Investments | Annuities | Information about a New Contract | | LifeCo Annuities Information about a New Contract |
| Investments | Annuities | Other | | LifeCo Annuities Other |
| Investments | Annuities | Service to your Existing Contract | | LifeCo Annuities Service to your Existing Contract |
| Investments | Brokerage Services | Existing Account Questions/Servicing | | IMCO Brokerage Services Existing Account Questions/Servicing |
| Investments | Brokerage Services | Non-USAA Mutual Funds | | IMCO Brokerage Services Non-USAA Mutual Funds |
| Investments | Brokerage Services | Open an Account/Request Information | | IMCO Brokerage Services Open an Account/Request Information |
| Investments | Brokerage Services | Other | | IMCO Brokerage Services Other |
| Investments | Brokerage Services | Scheduled Transfers | | IMCO Brokerage Services Scheduled Transfers |
| Investments | Brokerage Services | Stock/Trading Questions | | IMCO Brokerage Services Stock/Trading Questions |
| Investments | Brokerage Services | Transfer Funds | | IMCO Brokerage Services Transfer Funds |
| Investments | Brokerage Services | Web Site Questions/Comments | | IMCO Brokerage Services Web Site Questions/Comments |
| Investments | College Savings | Existing Account Questions/Servicing | | IMCO College Savings Existing Account Questions/Servicing |
| Investments | College Savings | Incoming Transfer | | IMCO College Savings Incoming Transfer |

-continued

| 1st Inquiry Classifier 208a | 2nd Inquiry Classifier 208b | 3rd Inquiry Classifier 208c | Party Status 208d | Skill Set 208e |
|---|---|---|---|---|
| Investments | College Savings | Open an Account/Request Information | | IMCO College Savings Open an Account/Request Information |
| Investments | College Savings | Other | | IMCO College Savings Other |
| Investments | College Savings | Questions About College Savings Plans | | IMCO College Savings Questions About College Savings Plans |
| Investments | College Savings | Sell Shares/Outbound Transfer | | IMCO College Savings Sell Shares/Outbound Transfer |
| Investments | College Savings | Web Site Questions/Comments | | IMCO College Savings Web Site Questions/Comments |
| Investments | IRAs | Convert to Roth IRA | | IMCO IRAs Convert to Roth IRA |
| Investments | IRAs | Existing Account Questions/Servicing | | IMCO IRAs Existing Account Questions/Servicing |
| Investments | IRAs | Incoming Transfer/Rollover | | IMCO IRAs Incoming Transfer/Rollover |
| Investments | IRAs | Open an Account | | IMCO IRAs Open an Account |
| Investments | IRAs | Other | | IMCO IRAs Other |
| Investments | IRAs | Questions About IRAs | | IMCO IRAs Questions About IRAs |
| Investments | IRAs | Web Site Questions/Comments | | IMCO IRAs Web Site Questions/Comments |
| Investments | IRAs | Withdrawal Funds/Outbound Transfers | | IMCO IRAs Withdrawal Funds/Outbound Transfers |
| Investments | Mutual Funds | Automatic Contributions | | IMCO Mutual Funds Automatic Contributions |
| Investments | Mutual Funds | Existing Account Questions/Servicing | | IMCO Mutual Funds Existing Account Questions/Servicing |
| Investments | Mutual Funds | Mutual Fund Questions/Comments | | IMCO Mutual Funds Mutual Fund Questions/Comments |
| Investments | Mutual Funds | Open an Account/Request Information | | IMCO Mutual Funds Open an Account/Request Information |
| Investments | Mutual Funds | Other | | IMCO Mutual Funds Other |
| Investments | Mutual Funds | Transfer Funds | | IMCO Mutual Funds Transfer Funds |
| Investments | Mutual Funds | Web Site Questions/Comments | | IMCO Mutual Funds Web Site Questions/Comments |
| Investments | Other | N/A | | IMCO Investments Other |
| Investments | Personalized Asset Management | Other | | IMCO Personalized Asset Management Other |
| Investments | Personalized Asset Management | Questions For Your Representative | | IMCO Personalized Asset Management Questions For Your Representative |
| Investments | Personalized Asset Management | Request Product Information | | IMCO Personalized Asset Management Request Product Information |

For example, the chart below illustrates a plurality of possibilities available for a first inquiry classifier 208a of "Other" including the available second inquiry classifiers 208b when "Other" is selected as the first inquiry classifier. Furthermore, the chart below illustrates that the third inquiry classifier 208c and the party status 208d may not help determine the skill set 208e:

| 1st Inquiry Classifier 208a | 2nd Inquiry Classifier 208b | 3rd Inquiry Classifier 208c | Party Status 208d | Skill Set 208e |
|---|---|---|---|---|
| Other | General Feedback | N/A | | Enterprise General Feedback |
| Other | Other | N/A | | Enterprise Other |

-continued

| 1st Inquiry Classifier 208a | 2nd Inquiry Classifier 208b | 3rd Inquiry Classifier 208c | Party Status 208d | Skill Set 208e |
|---|---|---|---|---|
| Other | Update Personal Information (example: Address change) | N/A | | Enterprise Update Personal Information |
| Other | usaa.com Website | N/A | | Enterprise usaa.com Website Technical Support |

For example, the chart below illustrates a plurality of possibilities available for a first inquiry classifier 208a of "Shopping and Discounts" including the available second inquiry classifiers 208b when "Shopping and Discounts" is selected as the first inquiry classifier and the available third inquiry classifiers for the selected second inquiry classifiers. Furthermore, the chart below illustrates that the party status 208d may not help determine the skill set 208e:

| 1st Inquiry Classifier 208a | 2nd Inquiry Classifier 208b | 3rd Inquiry Classifier 208c | Party Status 208d | Skill Set 208e |
|---|---|---|---|---|
| Shopping & Discounts | Discount Services | ADT Home Security & Companion Svcs | | ASC Discount Services ADT Home Security & Companion Svcs |
| Shopping & Discounts | Discount Services | AHS American Home Shield Warranty | | ASC Discount Services AHS American Home Shield Warranty |
| Shopping & Discounts | Discount Services | Car Rentals | | ASC Discount Services Car Rentals Avis |
| Shopping & Discounts | Discount Services | Car Rentals Budget | | ASC Discount Services Car Rentals Buggt |
| Shopping & Discounts | Discount Services | Car Rentals Hertz | | ASC Discount Services Car Rentals Hertz |
| Shopping & Discounts | Discount Services | FedEx Express and Ground Delivery Svc | | ASC Discount Services FedEx Express and Ground Delivery Svc |
| Shopping & Discounts | Discount Services | Other | | ASC Discount Services Other |
| Shopping & Discounts | Online Shopping/USAA Catalog Orders | Get Order Stratus | | ASC Online Shopping/ Catalog Orders Get Order Status |
| Shopping & Discounts | Online Shopping/USAA Catalog Orders | Jewelry Appraisals | | ASC Online Shopping/ Catalog Orders Jewelry Appraisals |
| Shopping & Discounts | Online Shopping/USAA Catalog Orders | Order Flowers- Teleflora | | ASC Online Shopping/ Catalog Orders Order Flowers- Teleflora |
| Shopping & Discounts | Online Shopping/USAA Catalog Orders | Other | | ASC Online Shopping/ Catalog Orders Other |
| Shopping & Discounts | Online Shopping/USAA Catalog Orders | Request Product Information | | ASC Online Shopping/ Catalog Orders Request Product Information |
| Shopping & Discounts | Online Shopping/USAA Catalog Orders | Returns and Exchanges | | ASC Online Shopping/ Catalog Orders Returns and Exchanges |
| Shopping & Discounts | Other | Other | | ASC Shopping & Discounts Other |
| Shopping & Discounts | Travel Services | Car Rentals | | ASC Travel Services Car Rentals Avis |
| Shopping & Discounts | Travel Services | Car Rentals Budget | | ASC Travel Services Car Rentals Budget |
| Shopping & Discounts | Travel Services | Car Rentals Hertz | | ASC Travel Services Car Rentals Hertz |
| Shopping & Discounts | Travel Services | Cruise Travel and Land Tours | | ASC Travel Services Cruise Travel and Land Tours |

-continued

| 1st Inquiry Classifier 208a | 2nd Inquiry Classifier 208b | 3rd Inquiry Classifier 208c | Party Status 208d | Skill Set 208e |
|---|---|---|---|---|
| Shopping & Discounts | Travel Services | Get Travel Insurance | | ASC Travel Services Get Travel insurance |
| Shopping & Discounts | Travel Services | Other | | ASC Travel Services Other |

In an embodiment, different combination of the first inquiry classifier 208a, second inquiry classifier 208b, third inquiry classifier 208c, and party status 208d translate into a first translated level 208f, a second translated level 208g, and a skill set 208h. For example, the chart below illustrates a plurality of possibilities available for a first inquiry classifier 208a of "Insurance" including the available second inquiry classifiers 208b when "Insurance" is selected as the first inquiry classifier and the available third inquiry classifiers for the selected second inquiry classifiers. Furthermore, the chart below illustrates that the party status 208d may or may not help determine the a first translated level 208f, the second translated level 208g, and the skill set 208h:

| 1st Inquiry Classifier 208a | 2nd Inquiry Classifier 208b | 3rd Inquiry Classifier 208c | Party Status 208d | 1st Translated Level 208f | 2nd Translated Level 208g | Skill Set 208h |
|---|---|---|---|---|---|---|
| Insurance | Auto | Antique Auto | Employee | General Agency | Auto | Auto Employee |
| Insurance | Auto | Antique Auto | Select | General Agency | Auto | Auto Select |
| Insurance | Auto | Antique Auto | | General Agency | Auto | Antique Auto |
| Insurance | Property | Boat | Employee | General Agency | Property | Property Employee |
| Insurance | Property | Boat | Select | General Agency | Property | Property Select |
| Insurance | Property | Boat | | General Agency | Property | Boat |
| Insurance | Property | Earthquake | Employee | General Agency | Property | Property Employee |
| Insurance | Property | Earthquake | Select | General Agency | Property | Property Select |
| Insurance | Property | Earthquake | | General Agency | Property | Earthquake |
| Insurance | Property | Flood | Employee | General Agency | Property | Property Employee |
| Insurance | Property | Flood | Select | General Agency | Property | Property Select |
| Insurance | Property | Flood | | General Agency | Property | Flood |
| Insurance | Auto | Antique Auto | Europe | International | Auto | Auto International Europe |
| Insurance | Auto | Antique Auto | non-Europe | International | Auto | Auto International non-Europe |
| Insurance | Auto | Auto Sales | Europe | International | Auto | Auto International Europe |
| Insurance | Auto | Auto Sales | non-Europe | International | Auto | Auto International non-Europe |
| Insurance | Auto | Billing | Europe | International | Auto | Auto International Europe |
| Insurance | Auto | Billing | non-Europe | International | Auto | Auto International non-Europe |
| Insurance | Auto | Complex Billing | Europe | International | Auto | Auto International Europe |
| Insurance | Auto | Complex Billing | non-Europe | International | Auto | Auto International non-Europe |
| Insurance | Auto | Other | Europe | International | Auto | Auto International Europe |

-continued

| 1st Inquiry Classifier 208a | 2nd Inquiry Classifier 208b | 3rd Inquiry Classifier 208c | Party Status 208d | 1st Translated Level 208f | 2nd Translated Level 208g | Skill Set 208h |
|---|---|---|---|---|---|---|
| Insurance | Auto | Other | non-Europe | International | Auto | Auto International non-Europe |
| Insurance | Auto | Quote/Adjust Existing Policy | Europe | International | Auto | Auto International Europe |
| Insurance | Auto | Quote/Adjust Existing Policy | non-Europe | International | Auto | Auto International non-Europe |
| Insurance | Property | Billing | Europe | International | Property | Property International Europe |
| Insurance | Property | Billing | non-Europe | International | Property | Property International non-Europe |
| Insurance | Property | Boat | Europe | International | Property | Property International Europe |
| Insurance | Property | Boat | non-Europe | International | Property | Property International non-Europe |
| Insurance | Property | Complex Billing | Europe | International | Property | Property International Europe |
| Insurance | Property | Complex Billing | non-Europe | International | Property | Property International non-Europe |
| Insurance | Property | Earthquake | Europe | International | Property | Property International Europe |
| Insurance | Property | Earthquake | non-Europe | International | Property | Property International non-Europe |
| Insurance | Property | Flood | Europe | International | Property | Property International Europe |
| Insurance | Property | Flood | non-Europe | International | Property | Property International non-Europe |
| Insurance | Property | Other | Europe | International | Property | Property International Europe |
| Insurance | Property | Other | non-Europe | International | Property | Property International non-Europe |
| Insurance | Property | Quote/Adjust an Existing Policy | Europe | International | Property | Property International Europe |
| Insurance | Property | Quote/Adjust an Existing Policy | non-Europe | International | Property | Property International non-Europe |
| Insurance | Annuities | ANY | Complaint | Life Co. | Annuities | Life Complaint |
| Insurance | Annuities | ANY | Employee | Life Co. | Annuities | Life Employee |
| Insurance | Annuities | ANY | Life Executive Complaint | Life Co. | Annuities | Life Executive Complaint |
| Insurance | Annuities | ANY | Select | Life Co. | Annuities | Life Select |
| Insurance | Annuities | Cancellation | | Life Co. | Annuities | Cancellation |
| Insurance | Annuities | Information about a New Contract | | Life Co. | Annuities | Information about a new Contract |
| Insurance | Annuities | Other | | Life Co. | Annuities | Other/Misc. |
| Insurance | Annuities | Service to your Existing Contract | | Life Co. | Annuities | Service to your Existing Contract |
| Insurance | Life | ANY | Life Executive Complaint | Life Co. | Insurance Life | Life Executive Complaint |
| Insurance | Life | ANY | Complaint | Life Co. | Life | Life Complaint |
| Insurance | Life | ANY | Employee | Life Co. | Life | Life Employee |

-continued

| 1st Inquiry Classifier 208a | 2nd Inquiry Classifier 208b | 3rd Inquiry Classifier 208c | Party Status 208d | 1st Translated Level 208f | 2nd Translated Level 208g | Skill Set 208h |
|---|---|---|---|---|---|---|
| Insurance | Life | ANY | Select | Life Co. | Life | Life Select |
| Insurance | Life | Cancellation | | Life Co. | Life | Life Cancellation |
| Insurance | Life | Get A Quote | | Life Co. | Life | Life Get A Quote |
| Insurance | Life | Other | | Life Co. | Life | Life Other/Misc. |
| Insurance | Life | Report a Claim | | Life Co. | Life | Life Report a Claim |
| Insurance | Life | Service to your Existing Policy | | Life Co. | Life | Life Service to your Existing Policy |
| Insurance | Life | Service to your Pending Policy | | Life Co. | Life | Life Service to your Pending Policy |
| Insurance | Medicare/ Long Term Care | ANY | Complaint | Life Co. | Medicare/ Long Term Care | Life Complaint |
| Insurance | Medicare/ Long Term Care | ANY | Employee | Life Co. | Medicare/ Long Term Care | Life Employee |
| Insurance | Medicare/ Long Term Care | ANY | Life Executive Complaint | Life Co. | Medicare/ Long Term Care | Life Executive Complaint |
| Insurance | Medicare/ Long Term Care | ANY | Select | Life Co. | Medicare/ Long Term Care | Life Select |
| Insurance | Medicare/ Long Term Care | Claim Inquiry for your Existing Medicare Supplement Policy | | Life Co. | Medicare/ Long Term Care | Claim Inquiry for your Existing Medicare Supplement Policy |
| Insurance | Medicare/ Long Term Care | Get a Quote for Medicare or Long Term Care Insurance | | Life Co. | Medicare/ Long Term Care | Get a Quote for Medicare or Long Term Care Insurance |
| Insurance | Medicare/ Long Term Care | Other | | Life Co. | Medicare/ Long Term Care | Other/Misc. |
| Insurance | Medicare/ Long Term Care | Service to your Existing Medicare Supplement Policy | | Life Co. | Medicare/ Long Term Care | Service to your Existing Medicare Supplement Policy |
| Insurance | Auto | Auto Sales | Prospective | Member Acquisition | Auto | Auto Sales Prospective |
| Insurance | Auto | Auto Sales | Prospective Employee | Member Acquisition | Auto | Auto Sales Prospective Employee |
| Insurance | Auto | Auto Sales | Prospective International | Member Acquisition | Auto | Auto Sales Prospective International |
| Insurance | Auto | Auto Sales | Prospective New Jersey | Member Acquisition | Auto | Auto Sales Prospective New Jersey |
| Insurance | Property | Renters Sales | Prospective | Member Acquisition | Property | Property Prospective |
| Insurance | Property | Renters Sales | Prospective International | Member Acquisition | Property | Renters Sales Prospective International |
| Insurance | Property | Renters Sales | Prospective New Jersey | Member Acquisition | Property | Renters Sales Prospective New Jersey |
| Insurance | Property | Valuable Personal Property | Prospective | Member Acquisition | Property | Property Prospective |
| Insurance | Property | Valuable Personal Property | Prospective Employee | Member Acquisition | Property | Property Prospective Employee |
| Insurance | Property | Valuable Personal Property | Prospective International | Member Acquisition | Property | Valuable Personal Property Prospective International |

| 1st Inquiry Classifier 208a | 2nd Inquiry Classifier 208b | 3rd Inquiry Classifier 208c | Party Status 208d | 1st Translated Level 208f | 2nd Translated Level 208g | Skill Set 208h |
|---|---|---|---|---|---|---|
| Insurance | Property | Valuable Personal Property | Prospective New Jersey | Member Acquisition | Property | Valuable Personal Property Prospective New Jersey |
| Insurance | Auto | Complex Billing | Employee | P&C Billing | Auto | Auto Employee |
| Insurance | Auto | Complex Billing | Select | P&C Billing | Auto | Auto Select |
| Insurance | Auto | Complex Billing |  | P&C Billing | Auto | Complex Billing |
| Insurance | Property | Complex Billing | Employee | P&C Billing | Property | Property Employee |
| Insurance | Property | Complex Billing | Select | P&C Billing | Property | Property Select |
| Insurance | Property | Complex Billing |  | P&C Billing | Property | Complex Billing |
| Insurance | Auto Claims | ANY |  | P&C Executive Complaint | P&C Claims | Auto Claims | P&C Executive Complaint |
| Insurance | Auto Claims | All United States |  | P&C Claims | Auto Claims | All United States |
| Insurance | Auto Claims | Auto Claim | Central Region | P&C Claims | Auto Claims | Auto Claim Central Region |
| Insurance | Auto Claims | Auto Claim | Employee | P&C Claims | Auto Claims | Auto Claim Employee |
| Insurance | Auto Claims | Auto Claim | International | P&C Claims | Auto Claims | Auto Claim International |
| Insurance | Auto Claims | Auto Claim | MARO Region | P&C Claims | Auto Claims | Auto Claim MARO Region |
| Insurance | Auto Claims | Auto Claim | MSTRO Region | P&C Claims | Auto Claims | Auto Claim MSTRO Region |
| Insurance | Auto Claims | Auto Claim | NE Region | P&C Claims | Auto Claims | Auto Claim NE Region |
| Insurance | Auto Claims | Auto Claim | SERO Region | P&C Claims | Auto Claims | Auto Claim SERO Region |
| Insurance | Auto Claims | Auto Claim | SW Region | P&C Claims | Auto Claims | Auto Claim SW Region |
| Insurance | Auto Claims | Auto Claim | WESTRO Region | P&C Claims | Auto Claims | Auto Claim WESTRO Region |
| Insurance | Auto Claims | Glass/Roadside |  | P&C Claims | Auto Claims | Glass/Roadside |
| Insurance | Auto Claims | Other |  | P&C Claims | Auto Claims | Other/Misc. |
| Insurance | Property Claims | ANY | P&C Executive Complaint | P&C Claims | Property Claims | P&C Executive Complaint |
| Insurance | Property Claims | Property Claim | Central Region | P&C Claims | Property Claims | Property Claim Central Region |
| Insurance | Property Claims | Property Claim | Employee | P&C Claims | Property Claims | Property Claim Employee |
| Insurance | Property Claims | Property Claim | International | P&C Claims | Property Claims | Property Claim International |
| Insurance | Property Claims | Property Claim | MARO Region | P&C Claims | Property Claims | Property Claim MARO Region |
| Insurance | Property Claims | Property Claim | MSTRO Region | P&C Claims | Property Claims | Property Claim MSTRO Region |
| Insurance | Property Claims | Property Claim | NE Region | P&C Claims | Property Claims | Property Claim NE Region |
| Insurance | Property Claims | Property Claim | SERO Region | P&C Claims | Property Claims | Property Claim SERO Region |
| Insurance | Property Claims | Property Claim | SW Region | P&C Claims | Property Claims | Property Claim SW Region |
| Insurance | Property Claims | Property Claim | WESTRO Region | P&C Claims | Property Claims | Property Claim WESTRO Region |

-continued

| 1st Inquiry Classifier 208a | 2nd Inquiry Classifier 208b | 3rd Inquiry Classifier 208c | Party Status 208d | 1st Translated Level 208f | 2nd Translated Level 208g | Skill Set 208h |
|---|---|---|---|---|---|---|
| Insurance | Auto | ANY | P&C Executive Complaint | P&C Service | Auto | P&C Executive Complaint |
| Insurance | Auto | Auto Sales | Employee | P&C Service | Auto | Auto Employee |
| Insurance | Auto | Auto Sales | Massachusettes | P&C Service | Auto | Quote/Adjust Existing Policy Massachusettes |
| Insurance | Auto | Auto Sales | Select | P&C Service | Auto | Auto Select |
| Insurance | Auto | Auto Sales | | P&C Service | Auto | Auto Sales |
| Insurance | Auto | Billing | Employee | P&C Service | Auto | Auto Employee |
| Insurance | Auto | Billing | Select | P&C Service | Auto | Auto Select |
| Insurance | Auto | Billing | | P&C Service | Auto | Billing |
| Insurance | Auto | Other | Employee | P&C Service | Auto | Auto Employee |
| Insurance | Auto | Other | Select | P&C Service | Auto | Auto Select |
| Insurance | Auto | Other | | P&C Service | Auto | Other/Misc. |
| Insurance | Auto | Quote/Adjust Existing Policy | Employee | P&C Service | Auto | Auto Employee |
| Insurance | Auto | Quote/Adjust Existing Policy | Massachusetts | P&C Service | Auto | Quote/Adjust Existing Policy Massachusettes |
| Insurance | Auto | Quote/Adjust Existing Policy | Select | P&C Service | Auto | Auto Select |
| Insurance | Auto | Quote/Adjust an Existing Policy | | P&C Service | Auto | Quote/Adjust Existing Policy |
| Insurance | Property | ANY | P&C Executive Complaint | P&C Service | Property | P&C Executive Complaint |
| Insurance | Property | Billing | Employee | P&C Service | Property | Property Employee |
| Insurance | Property | Billing | Select | P&C Service | Property | Property Select |
| Insurance | Property | Billing | | P&C Service | Property | Billing |
| Insurance | Property | Other | Employee | P&C Service | Property | Property Employee |
| Insurance | Property | Other | Select | P&C Service | Property | Property Select |
| Insurance | Property | Other | | P&C Service | Property | Other/Misc. |
| Insurance | Property | Quote/Adjust an Existing Policy | Employee | P&C Service | Property | Property Employee |
| Insurance | Property | Quote/Adjust an Existing Policy | Select | P&C Service | Property | Property Select |
| Insurance | Property | Quote/Adjust an Existing Policy | | P&C Service | Property | Quote/Adjust an Existing Policy |
| Insurance | Property | Renters Sales | Employee | P&C Service | Property | Property Employee |
| Insurance | Property | Renters Sales | Europe | P&C Service | Property | Property International Europe |
| Insurance | Property | Renters Sales | Select | P&C Service | Property | Property Select |
| Insurance | Property | Renters Sales | non-Europe | P&C Service | Property | Property International non-Europe |
| Insurance | Property | Renters Sales | | P&C Service | Property | Renters Sales |

-continued

| 1st Inquiry Classifier 208a | 2nd Inquiry Classifier 208b | 3rd Inquiry Classifier 208c | Party Status 208d | 1st Translated Level 208f | 2nd Translated Level 208g | Skill Set 208h |
|---|---|---|---|---|---|---|
| Insurance | Property | Valuable Personal Property | Employee | P&C Service | Property | Property Employee |
| Insurance | Property | Valuable Personal Property | Europe | P&C Service | Property | Property International Europe |
| Insurance | Property | Valuable Personal Property | Select | P&C Service | Property | Property Select |
| Insurance | Property | Valuable Personal Property | non-Europe | P&C Service | Property | Property International non-Europe |
| Insurance | Property | Valuable Personal Property | | P&C Service | Property | Valuable Personal Property |
| Insurance | Property | Quote a New Purchase | Employee | Property Specialization | Property | Property Employee |
| Insurance | Property | Quote a New Purchase | Europe | Property Specialization | Property | Property International Europe |
| Insurance | Property | Quote a New Purchase | Prospective | Property Specialization | Property | Property Prospective |
| Insurance | Property | Quote a New Purchase | Prospective Employee | Property Specialization | Property | Property Prospective Employee |
| Insurance | Property | Quote a New Purchase | Prospective International | Property Specialization | Property | Quote a New Purchase Prospective International |
| Insurance | Property | Quote a New Purchase | Select | Property Specialization | Property | Property Select |
| Insurance | Property | Quote a New Purchase | non-Europe | Property Specialization | Property | Property International non-Europe |
| Insurance | Property | Quote a New Purchase | | Property Specialization | Property | Quote a New Purchase |

Referring now to FIGS. 1a, 1b, 1c, 2a, 2d and 2e, the method 200 then proceeds to step 210 where a representative is assigned to the inquiry from the party 115. In an embodiment, the provider 110 may include an inquiry response center having a plurality of representatives. In an embodiment, the inquiry response center may be an IHS network such as, for example, the network 105, with each of the representatives connected to the IHS network via an IHS such as, for example, the IHS 130. A representative supervisor may have access to a representative skill set website 210a, illustrated in FIG. 2e. The representative skill set website 210a includes a representative name section 210aa, a representative unit number section 210ab, a representative identification section 210ac, a skill sets section 210ad, a primary skill set selector 210ae, a secondary skill set selector 210af, and a reviewer selector 210ag. The skill sets section 210ad includes a plurality of skill set selectors that are organized under sections such as, for example, a banking section 210ada having a plurality of subsections such as, for example, a credit cards subsection 210adaa, a CDs/IRAs subsection 210adab, an auto, recreational, and personal loans subsection 210adac, and a mortgages/movers advantage subsection 210adad. A representative skill set website 210a may be generated and modified for every representative that is connected to the inquiry response center. The representative name section 210aa includes the name of the representative that the representative skill set website 210a has been generated for, the representative unit number section 210ab includes the number of a subsection of the inquiry response center that the representative belongs to, and the representative identification section 210ac includes an identification number assigned to the representative that the representative skill set website 210a has been generated for. The skills sets section 210ad includes selectors for every possible skill set a representative may have such as, for example, the skills sets 208e and 208h listed in the charts above, and the representative supervisor may select any of the selectors under, for example, the credit cards subsection 210adaa, the CDs/IRAs subsection 210adab, the auto, recreational, and personal loans subsection 210adac, and the mortgages/movers advantage subsection 210adad that correspond to knowledge possessed by the representative that the representative skill set website 210a has been generated for. Furthermore, the representative supervisor may use the primary skill set selector 210ae and the secondary skill set selector 210af for each skill set selected to indicate the degree of knowledge of the skill set that is possessed by the representative. The representative supervisor may also select a reviewer selector 210ag to indicate who may or must review responses created by the representative (described in further detail below.) With the skill set translated in step 208 of the method 200, the routing engine 110e accesses the representative database 110f and determines the representatives that have that skill set to provide a response to the inquiry. The routing engine 110e will then determine which of those representatives are available to provide a response to the inquiry (described in further detail below), and will forward the inquiry to a primary representative. In an embodiment, the routing engine 110e searches for inquiries that match the representatives skill sets as determined using the primary skill set selector 210ae in the skill set section 210*ad* and provides those inquiries to the primary representative. If the routing engine 110*e* does not find inquiries that match the representatives skill sets as determined using the primary skill set selector 210*ae* in the skill set section 210*ad*, the routing engine 110*e* searches for inquiries that match the representatives skill sets as determined using the secondary skill set selector 210*af* in the skill set section 210*ad* and provides those inquiries to the primary representative. In an embodiment, the skill set for a representative as determined using the primary skill set selector 210*ae* and the secondary skill set selector 210*af* may be modified depending on incoming inquiry volume such that the provider 110 may manage the inquiry response center more efficiently. In addition, the routing engine 110*e* may determine which representatives in the inquiry response center have not been assigned to an inquiry for the longest amount of time and may assign the inquiry to those representatives. In an embodiment, the representative supervisor may manually assign or re-assign an inquiry to a representative. In an embodiment, the primary representative is the first representative to receive the inquiry from the part 115. In an embodiment the representative supervisor may view all of the inquiries in the inquiry response center by assigned skill set and representative in order to determine, for example, what skill sets are being used to respond to inquiries at any given time.

Referring now to FIGS. 1*a*, 1*b*, 1*c*, 2*a* and 2*f*, the method 200 then proceeds to step 212 where the representative composes a response. In an embodiment, the primary representative may be connected to an IHS network such as, for example, the network 105, via an IHS such as, for example, the IHS 130. In an embodiment, the primary representative has access to a representative worklist website 212*a*. Illustrated in FIG. 2*f*. The representative worklist website 212*a* includes a status section 212*aa* where the primary representative may set their status using a plurality of selectors such as, for example, a available selector 212*aaa*, an unavailable selector 212*aab*, an away selector 212*aac*, and an offline selector 212*aad*. The representative worklist website 212*a* also includes a folders section 212*ab* where the primary representative may access current inquiries through a worklist link 212*aba* and pending inquiries through a pending link 212*abb*. The representative worklist website 212*a* also includes a search section 212*ac* where the primary representative may search for inquiries by providing information in one or more of a customer/party number field 212*aca*, representative identification field 212*acb*, and a plurality of date fields 212*acc* and 212*acd*. The representative worklist website 212*a* also includes a worklist section 212*ad* where the primary representative may manage inquiries that the primary representative is currently working on and that includes a from field 212*ada*, a customer/party number field 212*adb*, a subject field 212*adc*, a received field 212*add*, a due by field 212*ade*, and a compose new message link 212*adf*. In an embodiment, when the primary representative has the available selector 212*aaa* in the status section 212*aa* selected, the primary representative may receive the inquiry from the party 115 if the skill set translated in step 208 of the method 200 corresponds to a skill set assigned to the primary representative, described above with reference to FIG. 2*e*. The worklist section 212*ad* will then populate with an inquiry entry including the name of the party 115 in the from field 212*ada*, an identification number that was either previously assigned or assigned during step 206 of the method 200 in the customer/party number field 212*adb*, an inquiry subject that may be the translated skill set from step 208 of the method 200 in the subject field 212*adc*, a date the inquiry was submitted in the received field 212*add*, and a date and time that the inquiry must be responded to in the due by field 212*ade*. In an embodiment, the date and time in the due by field 212*ade* is 24 hours after the inquiry was received by the provider 115. The primary representative may then select the inquiry entry to view the narrative provided by the part 115 in step 206 of the method 200. The primary representative will then use their knowledge in their assigned skill set to compose a primary response to the inquiry by, for example, replying to the inquiry directly or using the compose new message link 212*adf* to compose a message to a party that has provided their inquiry by, for example, using a phone communication, a fax communication, a face-to-face communication, or a variety of other communication methods known in the art. In an embodiment, the worklist may automatically populate with a new inquiry from, for example, the party 120 or 125, when the response to the inquiry is sent to the party 115. In an embodiment, the worklist may populate with a predetermined number of inquiries and, as those inquiries are responded to, may populate the worklist section 212*ad* with new inquiries such that the predetermined number of inquiries is provided to the primary representative.

Furthermore, the metrics engine 110*g* is connected to the representative worklist website 212*a* and is operable to record and analyze the inquiries moving through the inquiry response center. For example, all inquiries provided to all of the representatives in the inquiry response center and the time used to provide a response for individual representatives are recorded in the metrics database. Such information may be analyzed to determine, for example, average response times for inquiries, inquiries processed per day or hour, and a variety of other types of information that can help in determining, for example, the productivity of individual representatives and what days of the week and what times of the day experience the most inquiries.

Referring now to FIGS. 1*a*, 1*b*, 1*c* and 2*a*, the method 200 then proceeds to decision block 214 where it is determined whether a supplementary response is needed. If it is determined that no supplementary response is needed, the primary response becomes an inquiry response and the method 200 proceeds to step 222. However, during step 212 of the method 200, the primary representative may determine that the inquiry includes a request for information on a second subject that the primary representative does not have a proper skill set to provide. In an alternative embodiment, during step 208 of the method 200, it may be determined that the inquiry included requests for information on multiple subjects requiring multiple representatives with different skill sets to provide an inquiry response. If it is determined that a supplementary response is needed, the method proceeds to step 216 where the inquiry is forwarded to a supplementary representative. In an embodiment, the supplementary representative is substantially similar to the primary representative and is connected to an IHS network such as, for example, the network 105, via an IHS such as, for example, the IHS 130, with the provision that the supplementary representative has been assigned a different skill set or sets than the primary representative using the representative skill set website 210*a*. In an embodiment, the primary representative has access to a representative worklist website that is substantially similar in design and operation to the representative worklist website 212*a*, illustrated in FIG. 2*f*. The method 200 then proceeds to step 218 where the supplementary representative uses their knowledge in their assigned skill set to compose a supplementary response to the inquiry. The method 200 then proceeds to step 220 where the primary response composed by the primary representative in step 212 of the method 200 and the supplementary response composed by the supplementary representative in step 218 of the method 200 are combined into an inquiry response.

Following step 220 of the method 200, or if at decision block 214 of the method 200 it is determined that no supplementary response is needed, the method 200 proceeds to step 222 where the inquiry response is reviewed. In an embodiment, the inquiry response may be reviewed for the primary representation and/or the supplementary representative based on the information provided by the representative supervisor in the reviewer selector 210*ag* on the representative skill set website 210*a*, described above with reference to FIG. 2*e*. In an alternative embodiment, the review is mandatory due to of the subject matter of the response such as, for example, a response to a financial inquiry or an investments inquiry. In an embodiment, the review may be for quality control of inquiry responses and a predetermined percentage of the inquiry responses from representatives in the inquiry response center may be reviewed. In an embodiment, the reviewer will correct any errors in the response or confirm that the response is correct. The method 200 then proceeds to step 224 where the response is sent to the party 115. The routing engine 110*e* may associate the response with all parties involved with the response such as, for example, the primary representative, the supplementary representative, and/or the reviewer, and store that association in the representative database 110*f*. The inquiry response is then provided to the communication engine, which sends the inquiry response to the party 115. The association of the inquiry response with the parties involved in the response allows the party 115 to respond to the inquiry response and to have that response routed to the primary representative, the supplementary representative, and/or the reviewer. In an embodiment, the provider 110 is a membership organization and the party 115 is a member of the membership organization and additional security is provided by sending the response to the member through a website of the membership organization rather than, for example, Simple Mail Transfer Protocol (SMTP). In an embodiment, the response may be read by a representative to the party 115 using a phone communication, sent to the party using a SMS or text message, using a fax communication, using an email communication, or using a variety of other communication tools known in the art. Thus, a system and method are provided that provide a common inquiry response tool for a provider across multiple lines of business that ensures that representatives of the provider receive only those types of inquiries that they have the skill set to respond to.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system, comprising:
a memory; and
a processor coupled to the memory and operable to execute instructions to:
receive, at an inquiry response center, a first inquiry, wherein the inquiry response center comprises a plurality of representatives, each assigned to a skill set;
determine an available one of the plurality of representatives and route the first inquiry to the available representative, wherein the first inquiry includes an inquiry classifier; and
receive a second inquiry and route the second inquiry to the available representative in response to the representative providing a response to the first inquiry.

2. The system of claim 1, including instructions executable to review the response provided by the available representative.

3. The system of claim 1, wherein the skill set includes at least one of a primary skill set and a secondary skill set.

4. The system of claim 1, including instructions executable to route the first inquiry based on a translation of the inquiry classifier into the skill set.

5. The system of claim 1, including instructions executable to record information for the available representative, wherein the information includes at least one of a number of inquiries received and a time used to provide an inquiry response.

6. The system of claim 5, wherein the information further includes previously collected classifying information associated with a party making the first inquiry.

7. A non-transitory computer-readable medium including instructions stored thereon and executable by a processor to:
provide a first set of inquiries to an inquiry response center, wherein the inquiry response center comprises a plurality of representatives;
assign each of the plurality of representatives at least one skill set;
route at least one inquiry in the first set to an available one of the plurality of representatives, wherein each inquiry includes a plurality of inquiry classifiers;
automatically populate a second set of inquiries; and
provide the second set to the available one of the plurality of representatives in response to an inquiry response to the at least one inquiry provided by the available one of the plurality of representatives.

8. The non-transitory computer-readable medium of claim 7, including instructions executable to determine a party status to include the in the plurality of inquiry classifiers.

9. The non-transitory computer-readable medium of claim 8, wherein the instructions executable to determine the party status include instructions executable to utilize a party identifier to access a party database that includes previously collected classifying information of the party.

10. The non-transitory computer-readable medium of claim 7, including instructions executable to generate a representative skill set website for each of the plurality of representatives.

11. The non-transitory computer-readable medium of claim 7, including instructions executable to route the at least one inquiry to a primary representative and a supplemental representative.

12. The non-transitory computer-readable medium of claim 11, including instructions executable to:
receive a primary response from the primary representative;
receive a secondary response from the secondary representative; and
combine the primary and the secondary response into an inquiry response.

* * * * *